(12) United States Patent
Lefebvre et al.

(10) Patent No.: US 10,816,088 B2
(45) Date of Patent: Oct. 27, 2020

(54) PLANET CARRIER FOR A SPEED-REDUCING UNIT WITH AN EPICYCLIC GEAR TRAIN

(71) Applicant: SAFRAN TRANSMISSION SYSTEMS, Colombes (FR)

(72) Inventors: Maxime Lefebvre, Moissy-Cramayel (FR); Jean-Charles Michel Pierre Di Giovanni, Moissy-Cramayel (FR); Jordane Emile André Peltier, Moissy-Cramayel (FR); Patrice Julien Ptaszynski, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 8 days.

(21) Appl. No.: 16/347,167

(22) PCT Filed: Oct. 31, 2017

(86) PCT No.: PCT/FR2017/052989
§ 371 (c)(1),
(2) Date: May 2, 2019

(87) PCT Pub. No.: WO2018/083410
PCT Pub. Date: May 11, 2018

(65) Prior Publication Data
US 2020/0072340 A1 Mar. 5, 2020

(30) Foreign Application Priority Data
Nov. 7, 2016 (FR) ..................... 16 60738

(51) Int. Cl.
*F16H 57/08* (2006.01)
*F16H 1/28* (2006.01)
*F16H 37/08* (2006.01)

(52) U.S. Cl.
CPC ............. *F16H 57/082* (2013.01); *F16H 1/28* (2013.01); *F05D 2220/323* (2013.01);
(Continued)

(58) Field of Classification Search
None
See application file for complete search history.

(56) References Cited

U.S. PATENT DOCUMENTS 7,214,160 B2 * 5/2007 Illerhaus ............... F16H 57/082
475/331
8,585,536 B2 * 11/2013 Norem .................. F16H 57/082
475/331
(Continued)

FOREIGN PATENT DOCUMENTS

| EP | 1 186 804 A1 | 3/2002 |
| EP | 1 482 210 A2 | 12/2004 |
| EP | 2 677 209 A1 | 12/2013 |

OTHER PUBLICATIONS

International Search Report dated Feb. 21, 2018, issued in corresponding International Application No. PCT/FR2017/052989, filed Oct. 31, 2017, 4 pages.

*Primary Examiner* — Dirk Wright
(74) *Attorney, Agent, or Firm* — Christensen O'Connor Johnson Kindness PLLC

(57) ABSTRACT

A planet carrier for a speed-reducing unit with a planetary gear set is provided. The planet carrier generally includes a torque transmission part having a longitudinal axis and an annular cage extending about the axis and connected to one longitudinal end of the part. The cage may include two sides extending radially relative to the axis and connected by bridges, and seats extending axially between the flanks and configured to support planetary gears rotatably mounted about the seats. The curved members may include at least two corresponding bars each inclined relative to a longitu- (Continued)

dinal plane passing both through the axis and substantially through the corresponding bar.

12 Claims, 2 Drawing Sheets

(52) U.S. Cl.
CPC .................. *F05D 2260/40311* (2013.01); *F16H 37/0833* (2013.01); *F16H 2001/289* (2013.01); *F16H 2057/087* (2013.01)

(56) References Cited

U.S. PATENT DOCUMENTS

| | | | |
|---|---|---|---|
| 8,814,747 B2 * | 8/2014 | Kleine-Brockhoff | ..... F16H 1/28 475/331 |
| 2013/0337967 A1 | 12/2013 | Kleine-Brockhoff et al. | |

* cited by examiner

PLANET CARRIER FOR A SPEED-REDUCING UNIT WITH AN EPICYCLIC GEAR TRAIN

TECHNICAL FIELD

The present invention relates to a planet carrier for a reduction gear with epicyclic gearing, in particular for an aircraft turbine engine.

STATE OF THE ART

A mechanical reduction gear has the purpose of changing the speed and/or torque ratio between the input shaft and the output shaft of a mechanism.

Conventionally, bypass turbine engines, in particular those having a high dilution rate, comprise a mechanical reduction gear with epicyclic gearing 10 (see FIG. 1) to drive the shaft 12 of a fan (not represented). Usually, the reduction gear with epicyclic gearing 10 has the purpose of transforming the so-called fast rotational speed of the power turbine 14 into a slower rotational speed for the shaft 12 driving the fan.

Conventionally, a reduction gear with epicyclic gearing 10 comprises (with respect to the longitudinal axis A of the turbine engine around which, in particular, the shaft of the power turbine 14 rotates):

- a solar pinion 16 in the form of a gearwheel mounted by means of a grooved connection on the shaft of the turbine 14, said pinion 16 rotating in a direction of rotation and driving the reduction gear 10,
- a planet carrier 18 carrying the planetary gears 20 by way of bearings, so as to rotate about axes Y parallel to the longitudinal axis A, the planetary gears 20 being formed by gearwheels engaging around the solar pinion 16, and the planet carrier 18 which can be secured to a stator,
- an external toothed ring 22, which engages with the planetary gears 20 and can be maintained fixed with respect to the structure of the turbine engine (a stator).

In particular, the planetary carrier 18 is one of the central parts of the reduction gear 10, supporting the bearing axes as well as the planetary gears 20. It has, in particular, the function of ensuring proper support conditions for the planetary gears 20 of the reduction gear with epicyclic gearing 10. One of the main requirements relating to a planet carrier 18 is to maintain the planetary gears 20 aligned, despite deformations undergone by the planet carrier 18, which is highly urged, and also not to break in the case of ultimate loads. A misalignment of the planetary gears 20 can, in particular, lead to premature wear of the gears and of the reduction gear 10.

The planet carrier 18 is conventionally a massive part made of steel and is therefore heavy.

Thus, the aim of the present application is to propose a planet carrier 18 capable of withstanding the applied loads while maintaining the alignment of the planetary gears 20, as light as possible.

PRESENTATION OF THE INVENTION

The invention proposes, for this purpose, a planet carrier for a reduction gear with epicyclic gearing, comprising a torque transmission member of a longitudinal axis A and an annular cage extending about the axis A and connected to a longitudinal end of the member, said cage comprising two sides extending substantially radially with respect to the axis A and connected by bridges, seats extending axially between the sides and intended to support planetary gears mounted to be rotational around the seats. In some embodiments, each bridge of the planet carrier comprises at least two corresponding bars, each bar being at an angle with respect to a longitudinal plane passing both through the axis A and substantially through the corresponding bar.

This structure can make it possible for weight savings of 20% with respect to the planet carriers according to the state of the art. This structure can also make it possible to make a gain on the radial misalignment of the planetary gears of −45% with respect to conventional planet carriers according to the state of the art.

This structure can also make it possible for a better accessibility for machining and maintenance operations. Since the architecture of the cage is more open than that of planet carriers according to the state of the art, this also facilitates endoscopic inspections, among other things. The maximum constraints and the tangential misalignment remain equivalent to those of the conventional planet carriers known from the state of the art.

The planet carrier according to the invention can comprise one or more of the following characteristics, taken individually or in combination with each other:

- each bridge comprises at least two intersecting bars,
- the two bars of each bridge intersect in a zone located in the proximity of one of the sides,
- said zone is located in the proximity of the side located on the opposite side of said transmission member,
- each bridge has a general X shape,
- at least one of the sides comprises, between two adjacent seats, at least one cavity,
- each cavity is aligned with a bridge according to a plane passing through the axis A,
- each cavity has a general U or V shape of which the opening is oriented radially outwards with respect to the axis A,
- the sides and the bridges are formed of one single piece.

The invention also relates to a speed reduction gear with epicyclic gearing comprising a planet carrier as described above. The invention also relates to a turbine engine, in particular of an aircraft, comprising a reduction gear with epicyclic gearing as described above.

BRIEF DESCRIPTION OF THE FIGURES

Other characteristics and advantages of the invention will appear upon reading the detailed description of embodiment examples below, in reference to the appended figures which represent, respectively.

DETAILED DESCRIPTION OF AN EMBODIMENT

Figure 1:
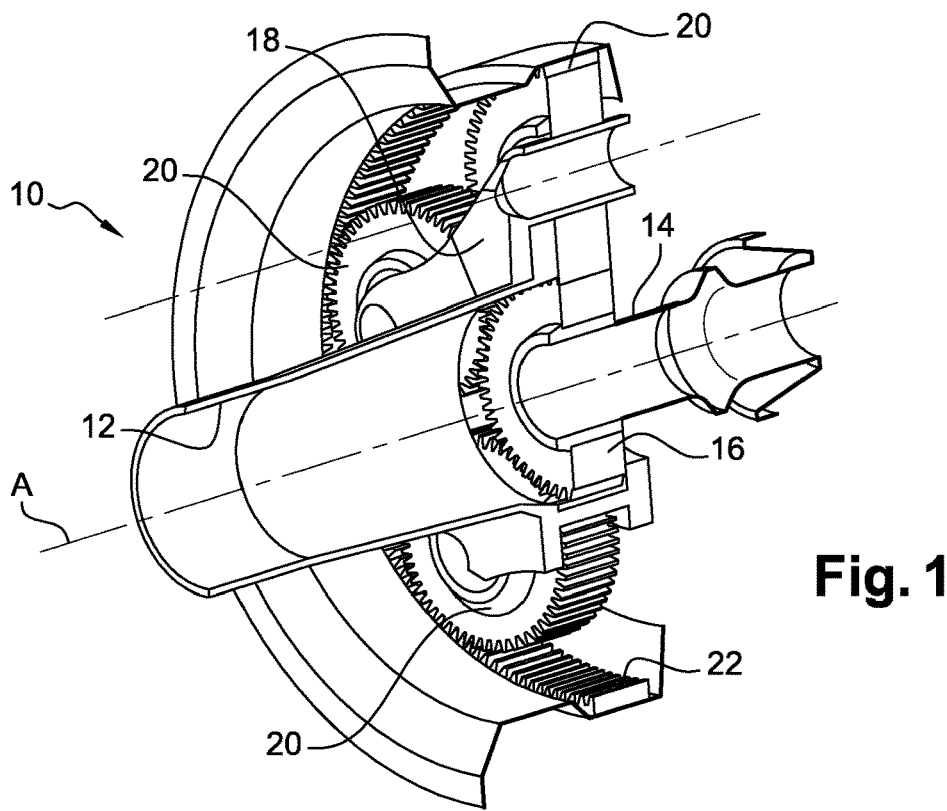
FIG. 1 is a perspective view of a conventional reduction gear with epicyclic gearing.

As mentioned above, FIG. 1 illustrates the general structure of a speed reduction gear with epicyclic gearing 10. During operations of the epicyclic gearing 10, with the torque transmitted through the reduction gear 10 being significant, this can cause a deformation of the planet carrier 18 and lead to the misalignment of the axes of the planetary gears 20. Moreover, centrifugal forces can also generate a deformation of the planet carrier 20, which can also cause a misalignment of the planetary gears 20. As mentioned above, it is crucial that the planet carrier 18 maintains the correct positioning of the planetary gears 20 despite deformations undergone by the planet carrier 18 during operations.

Figure 2:
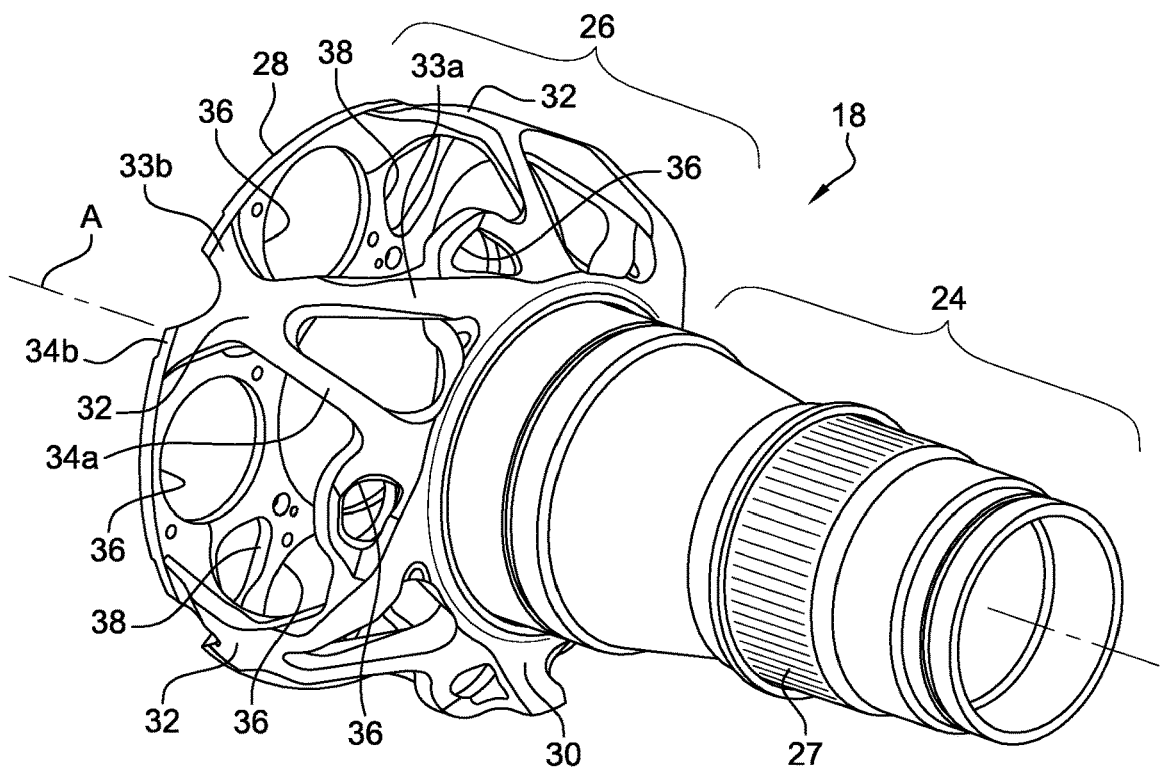
FIG. 2 is a perspective view of a planet carrier according to the invention.

As can be seen in FIG. 2, the planet carrier 18 according to the invention extends along the axis A and comprises two parts: a torque transmission member 24 of longitudinal axis A, and an annular cage 26 extending about the axis A. The annular cage 26 is connected to a longitudinal end of the torque member 24. The torque transmission member 24 is tubular and extends axially (according to the axis A). It has a general cylindrical or frustoconical shape, of which the longitudinal end is extended by an annular connection part and intended to connect to the shaft of the turbine 14 (see FIG. 1). Thus, the front longitudinal end of the member 24 is connected to the cage 26 of the rear end that comprises a gearing 27 intended to be engaged with the shaft of the turbine 14.

The front is defined as being on the fan side, and the rear is defined as being on the side of the exhaust pipe of the turbine engine.

Figure 3:
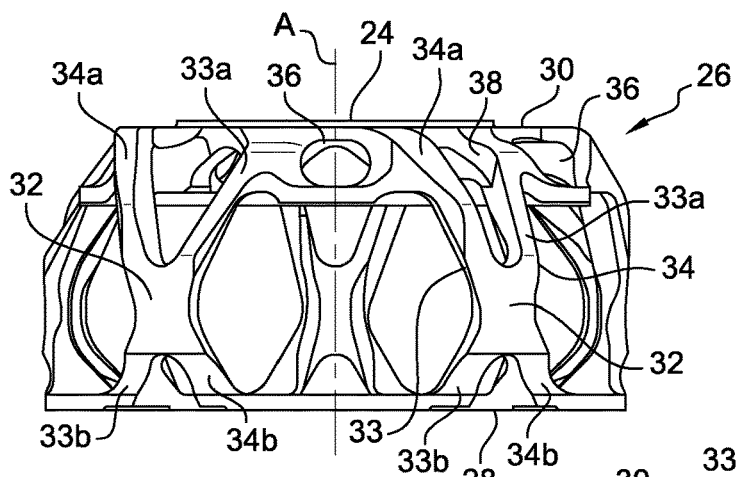
FIGS. 3 and 4 are top views of a cage of a planet carrier according to the invention.
Figure 4:
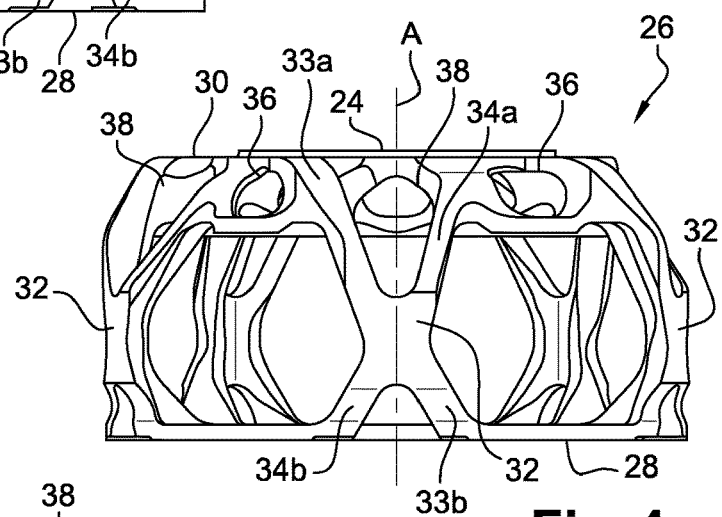
Figure 5:
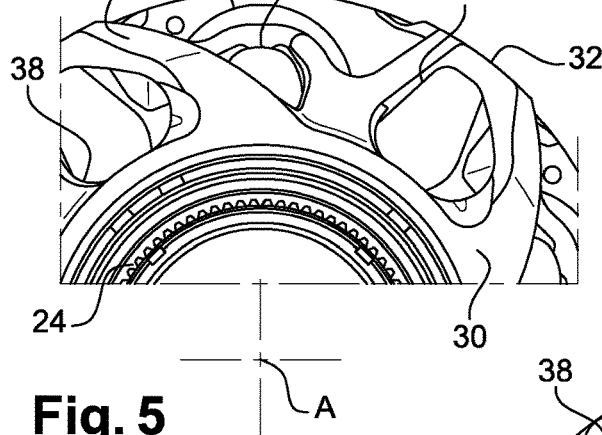
FIG. 5 is a front view of a reduction gear with epicyclic gearing according to the invention.

The annular cage 26 comprises two sides 28, 30 extending substantially radially with respect to the axis A, respectively a front side 28 and a rear side 30. The front side 28 is defined as the side located on the opposite side of the transmission member 24 and the rear side 30 is defined as being the side that is secured to the member 24. The two sides 28, 30 are connected to one another by bridges 32. As illustrated in FIGS. 2, 3 and 4, each bridge 32 comprises at least two intersecting bars 33, 34 and has a general X shape. Each bar 33, 34 is thus divided into two corresponding areas 33a, 33b, 34a, 34b substantially aligned and extending on either side of the intersection (or intersection zone) of the X. In the represented example, the two corresponding bars 33, 34 of each bridge 32 intersect in a zone located in the proximity of one of the sides 28, 30, the front side 28 in this case.

According to the embodiment presented, the sides 28, 30 and the bridges 32 are made of one single piece. This makes it possible for the planet carrier 18 to form a structural unit, thereby eliminating problems relating to the assembly of several pieces by way of additional connecting members. This makes it possible, in particular, to avoid imbalance problems generated by assembly tolerances, assembly problems, and additional weight due to there being multiple pieces.

Figure 6:
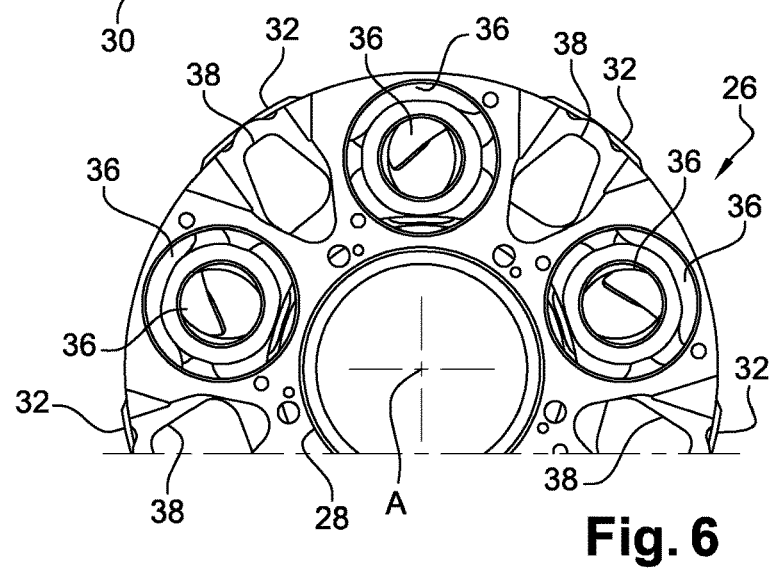
FIG. 6 is a rear view of a reduction gear with epicyclic gearing according to the invention.

As illustrated in FIGS. 2 and 6, the front 28 and rear 30 sides, each comprise holes 36, each for mounting an end of a shaft of a planetary gear 20, and thus forming the seat 36 for a planetary gear 20. These seats 36 thus extend axially (according the axis A) between the sides 28, 30 and are intended to support the planetary gears 20 mounted rotationally around the seats 36.

As can be seen in FIGS. 2 and 6, at least one of the sides 28, 30, in this case the front side 28, comprises, between two adjacent seats 36, at least one cavity 38 aligned with a bridge 32 along to a plane passing through the axis A (see FIG. 6). Each cavity 38 is located between the corresponding bars 33, 34 of each bridge 32 and has a general U or V shape of which the opening is oriented radially outwards with respect to the axis A.

In a manner known per se, during operations of the reduction gear 10, a first path of force passes through the rear side 30 (from the corresponding ends of the seats 36 and the planetary gears 20) and then through the torque transmission member 24. A second path of force goes through the front side 30 (from the corresponding ends of the seats 36 of the planetary gears 24 up to the zones connecting the front side 28 and the bridges 32), the bridges 32 then through the torque transmission member 24.

The cage 26 that supports the bearing axes (according to the axis Y) and therefore the planetary gears 20 has thus been shaped with the intersecting bars 33, 34 to obtain a "trellis" or "braces". This makes it possible for the correct passage of the force necessary for the functioning of the reduction gear 10 with a minimum amount of matter. The present invention therefore presents a solution that optimises the weight of the reduction gear 10 without impeding the force paths between the sides 28, 30, and by limiting the misalignment of the planetary gears 20.

This optimisation is obtained thanks to the particular inclination of the bars 33, 34 of the bridges 32. Indeed, the bars 33, 34 of the bridges are each divided into two parts: a rear part (close to the rear side 30) and a front part (close to the front side 28). The rear 33a, 34a and front 33b, 34b parts of each bar 33, 34 join each other at the intersection of the X formed by each bridge 32. The specificity of the invention is that, similarly to the corresponding bars 33, 34 with respect to one another, the rear parts 33a, 34a and front parts 33b, 34b of each bar 33, 34 of each bridge 32 do not extend in the same plane and form an angle different than 0 with one another. Thus, each bridge 32 comprises bars 33, 34 that are each inclined with respect to a first longitudinal plane passing through the axis A and substantially through the corresponding bar 33, 34 and therefore each part 33a, 34a is inclined with respect to a second longitudinal plane passing through A and substantially with the part of the corresponding bar 33b, 34b. This inclination difference of the bars 33, 34 with one another and of the different parts 33a, 34a, 33b, 34b with one another makes it possible to rigidify the planet carrier 26 in a torsional manner about the axis A during operations of the turbine engine.

Moreover, this structure of the gearing 10 makes it possible to perform primary milling operations from the outside of the gearing 10, which is not possible with a gearing 10 according to the state of the art.

The invention claimed is:

1. A planet carrier for a speed reduction gear with epicyclic gearing, comprising:
   a torque transmission member having a longitudinal axis; and
   an annular cage extending about the axis and connected to a longitudinal end of the member, the cage comprising:
      two sides extending substantially radially with respect to the axis and connected by bridges; and
      seats extending axially between the sides and configured to support planetary gears rotatably mounted around the seats,
   wherein each bridge comprises at least two corresponding bars, each inclined with respect to a longitudinal plane passing both through the axis and substantially through the corresponding bar.

2. The planet carrier according to claim 1, wherein each bridge comprises at least two intersecting bars.

3. The planet carrier according to claim 2, wherein the two bars of each bridge intersect in the zone located in the vicinity of one of the sides.

4. The planet carrier according to claim 3, wherein the zone is located in the proximity of the side located on the opposite side of the transmission member.

5. The planet carrier according to claim 1, wherein each bridge is substantially an X shape.

6. The planet carrier according to claim 1, wherein at least one of the sides comprises, between two adjacent seats, at least one cavity.

7. The planet carrier according to claim 6, wherein each cavity is aligned with a bridge along a plane passing through the axis.

8. The planet carrier according to claim 6, wherein each cavity is substantially an U or V shape of which the opening is oriented radially outwards with respect to the axis.

9. The planet carrier according to claim 1, wherein the sides and the bridges are formed of one single piece.

10. A reduction gear with epicyclic gearing comprising a satellite carrier according to claim 1.

11. A turbine engine comprising a reduction gear with epicyclic gearing according to claim 1.

12. The turbine engine according to claim 11, wherein the turbine engine is configured for an aircraft.

* * * * *